June 24, 1941.  A. H. BUCKLEY  2,247,275
AUTOMATIC MOTORIZED TYPEWRITER
Filed Feb. 23, 1939  9 Sheets-Sheet 6
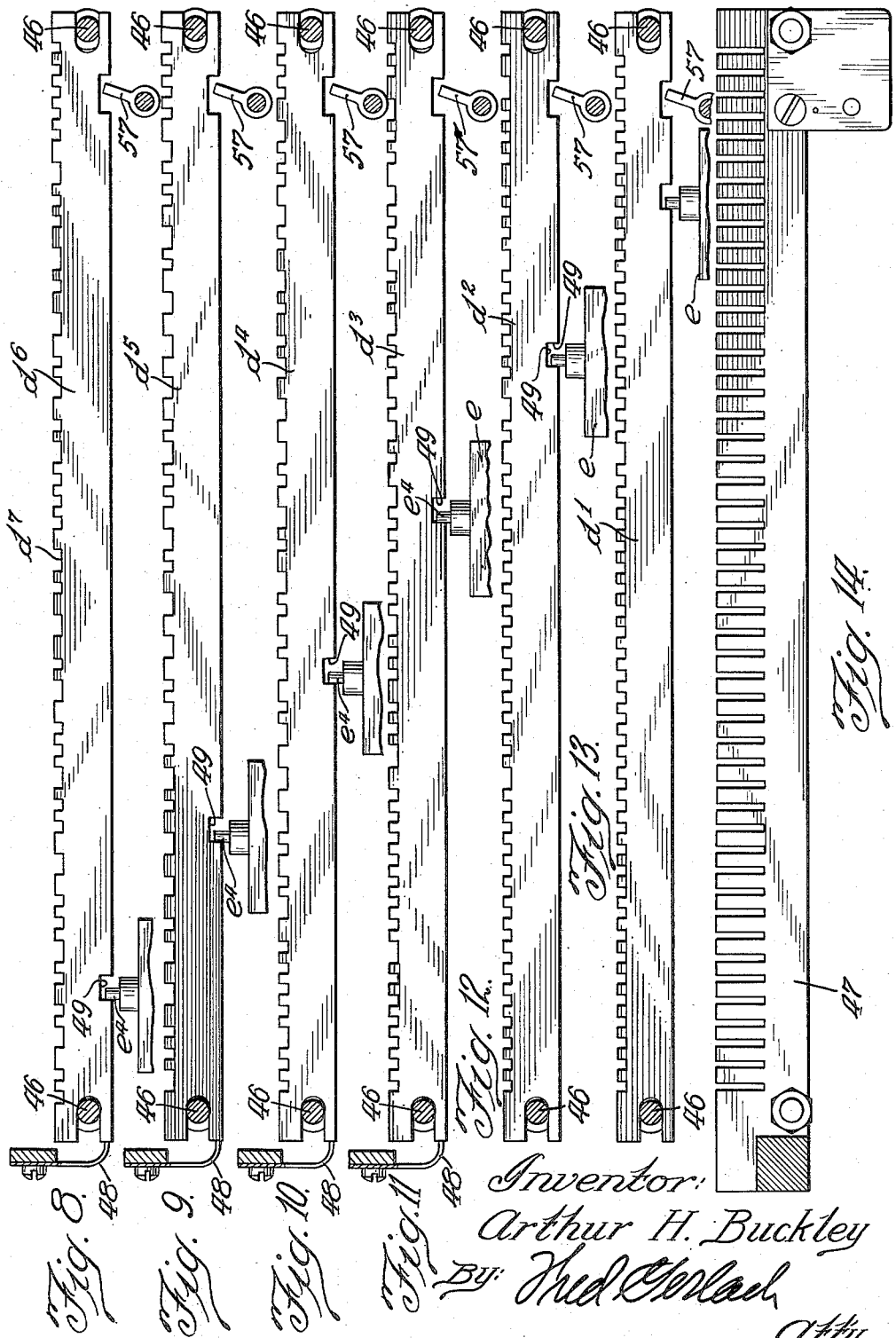
Inventor:
Arthur H. Buckley
By: Fred Gerlach
Atty.

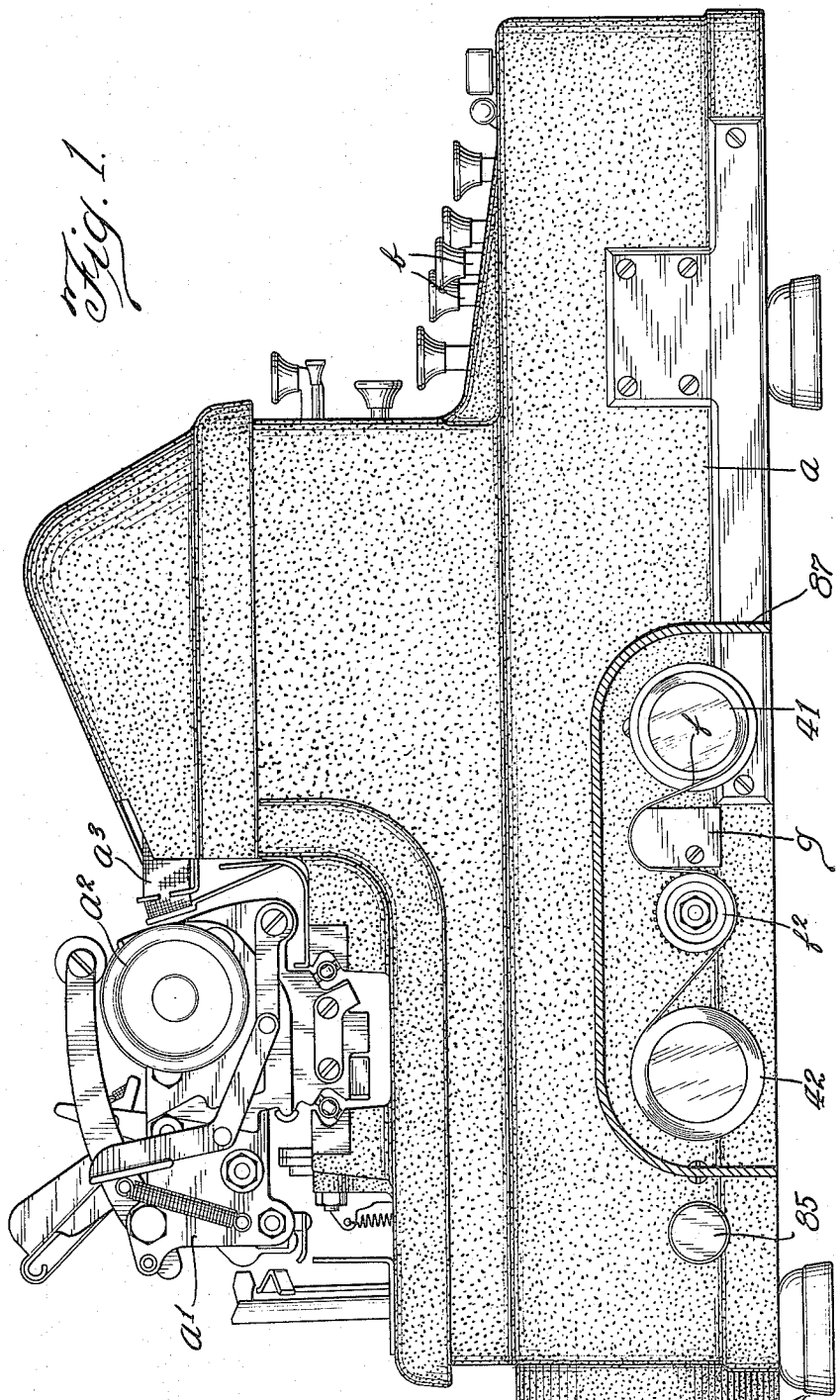

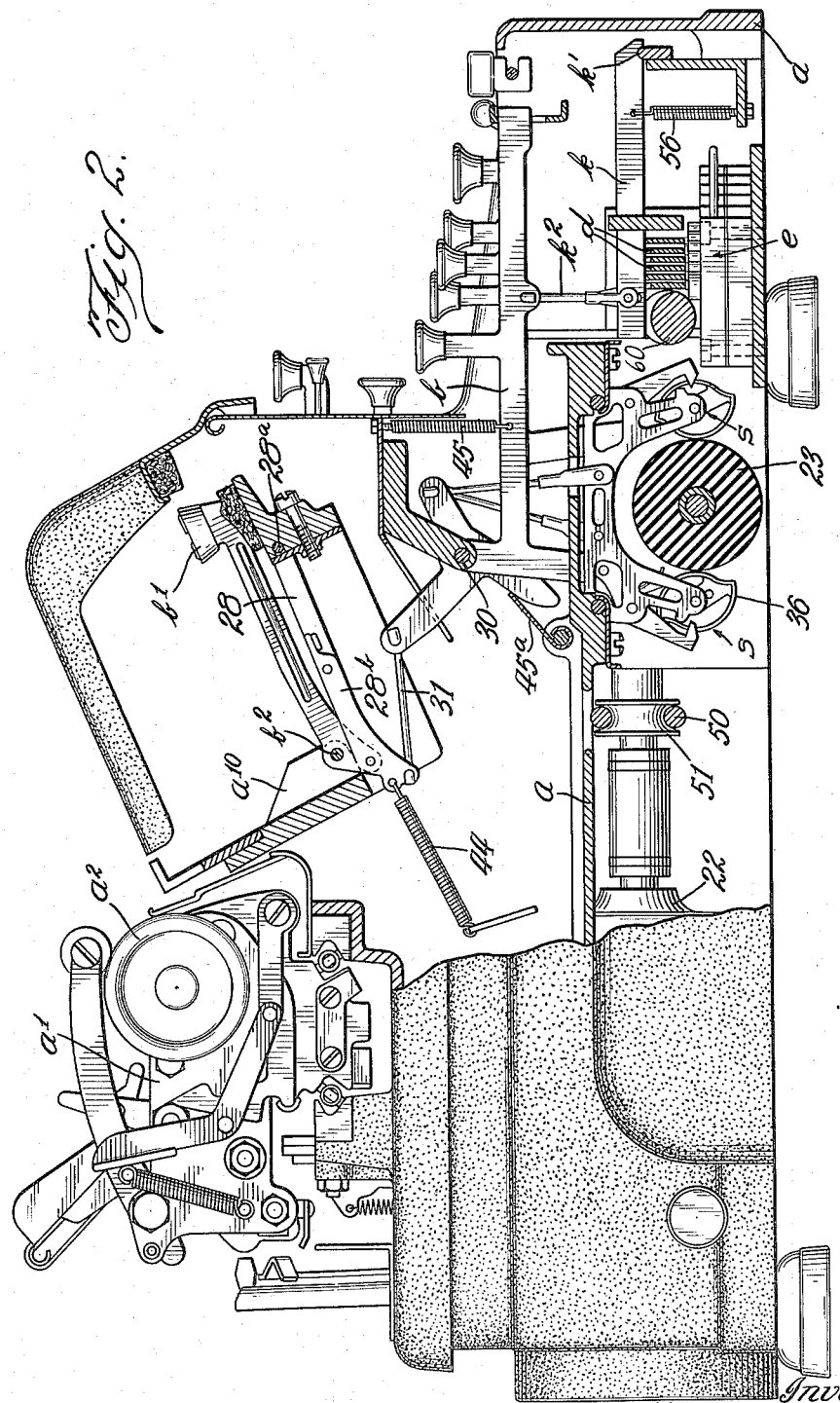

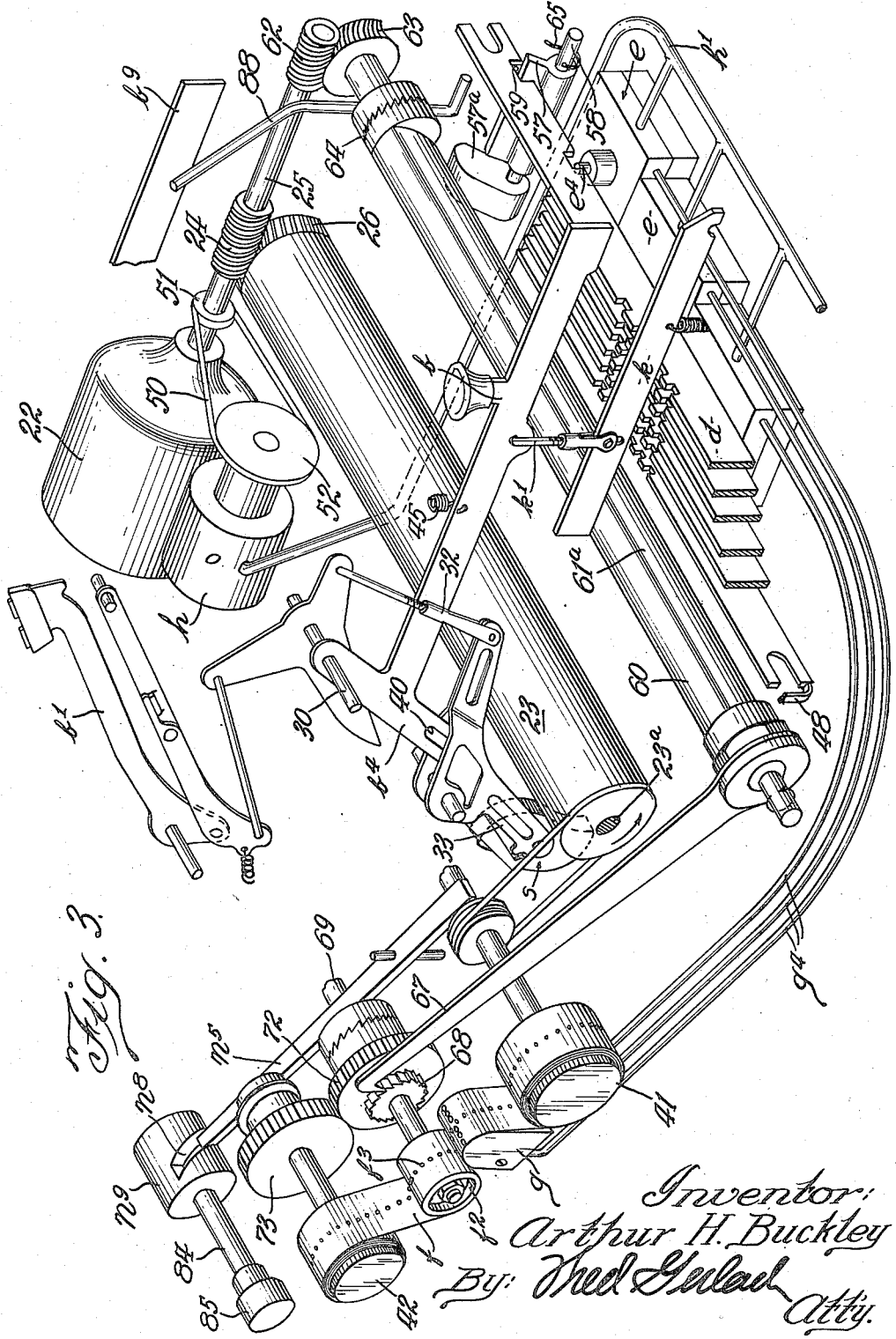

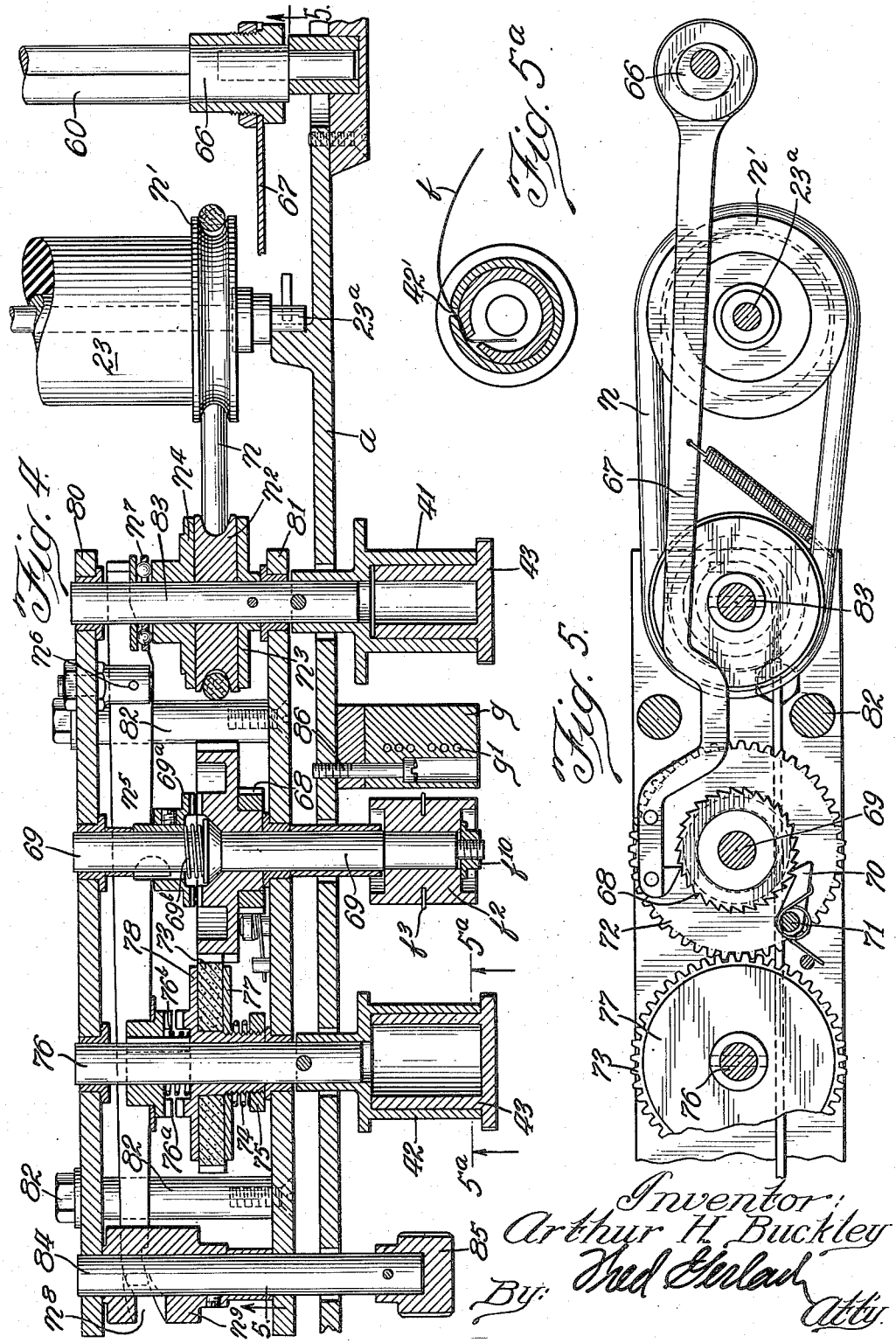

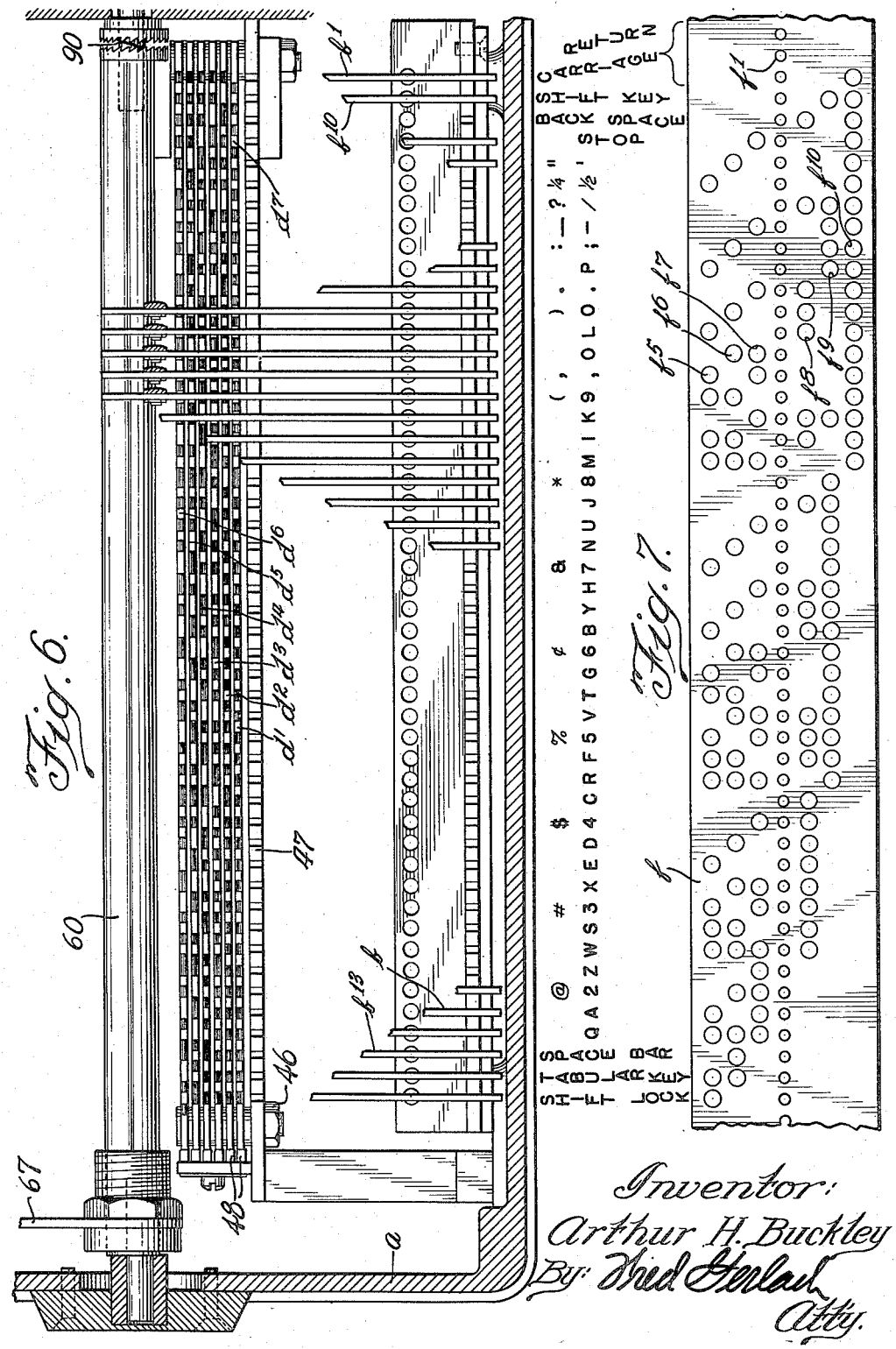

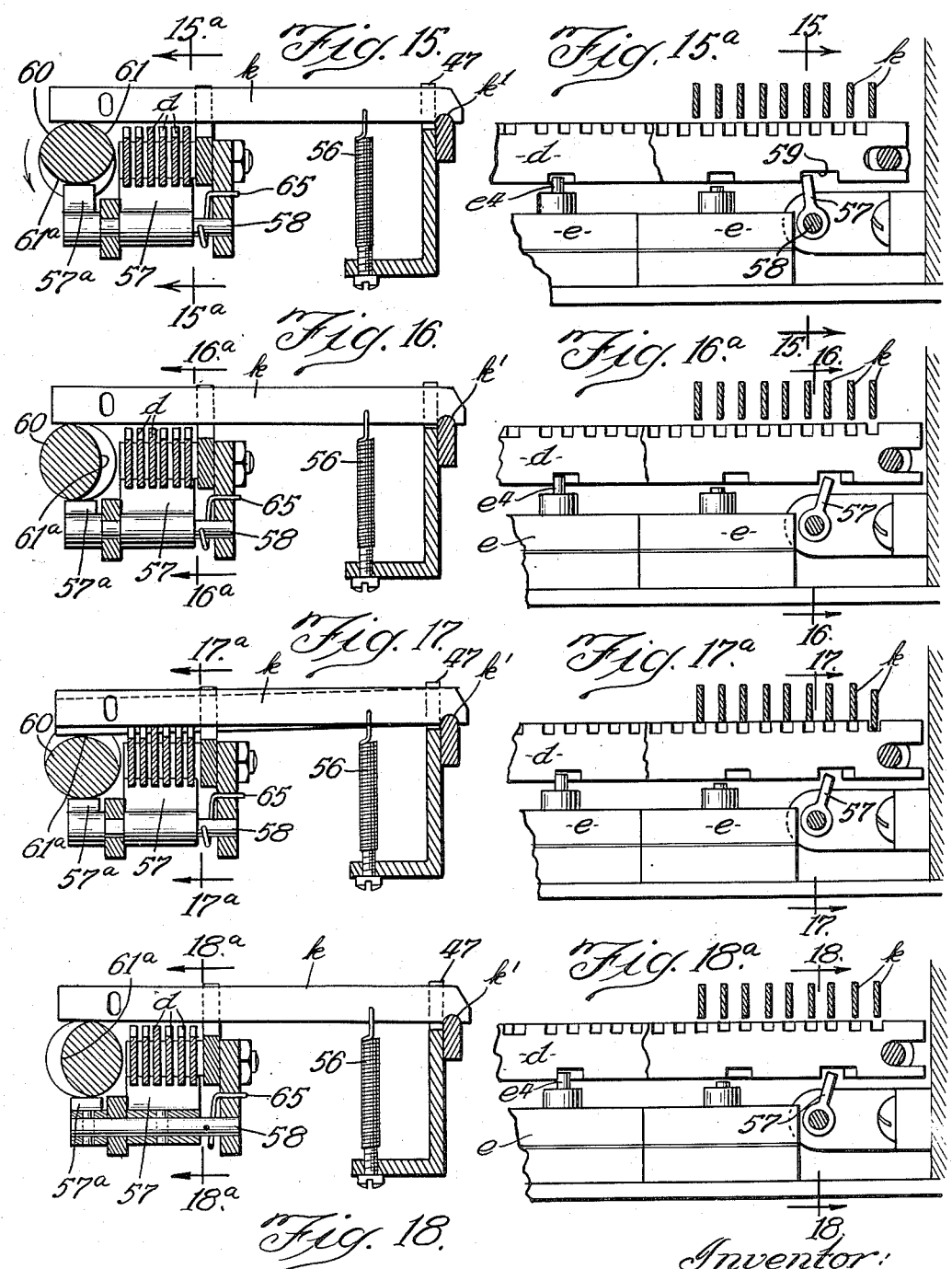

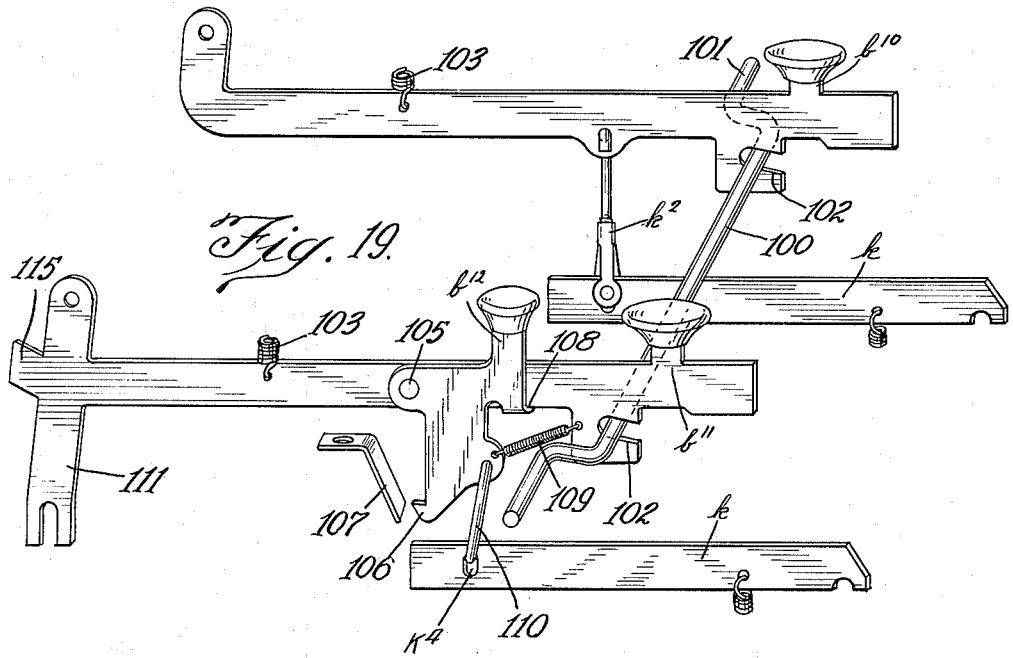
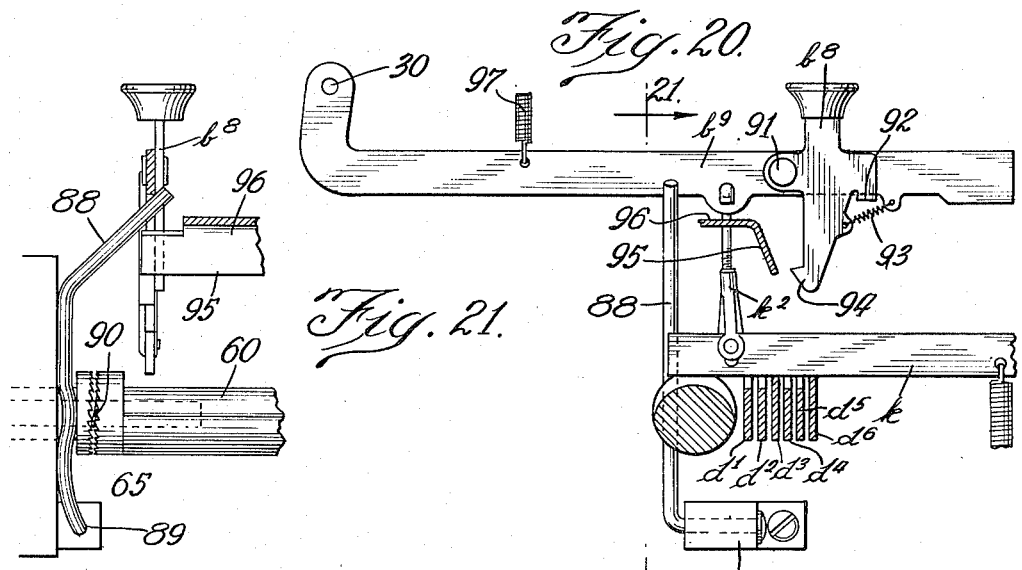
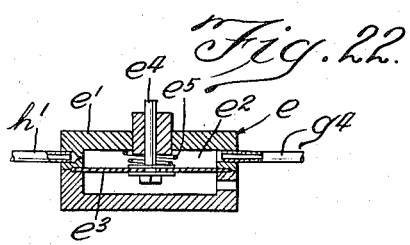

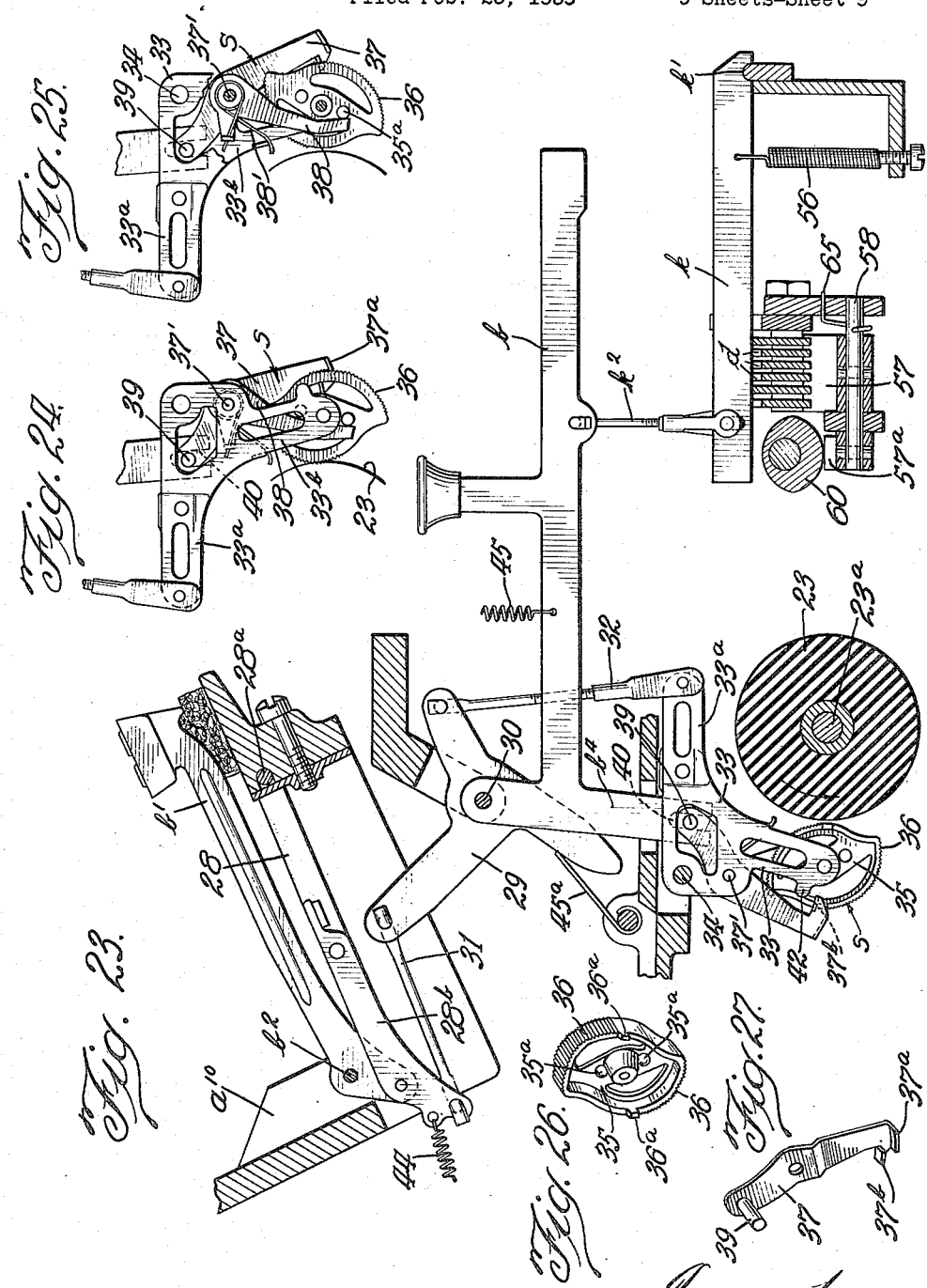

Patented June 24, 1941

2,247,275

UNITED STATES PATENT OFFICE 2,247,275

AUTOMATIC MOTORIZED TYPEWRITER

Arthur H. Buckley, Chicago, Ill.

Application February 23, 1939, Serial No. 257,775

27 Claims. (Cl. 197—20)

The invention relates to motorized typewriters.

One object of the invention is to provide improved automatic controlling mechanism for a motorized typewriter. This object is attained primarily by permuting the movements of a relatively small number of elements, such as bars, to control the power operable devices for mechanically shifting a full set of type bars, and other actions, such as the case-shift, spacers, and carriage return to perform their functions by power supplied by an electric motor.

Another object of the invention is to provide simple automatic control mechanism for a motorized typewriter, which is adapted for high speed operation.

Another object of the invention is to provide improved automatic controlling mechanism for a motorized typewriter in which a narrow tape with instrumentalities, such as perforations, permutably controls a relatively small number of actions which permutably control a series of corresponding members or controller elements which mechanically control the individual operation of a full set of keys to render operable devices for mechanically shifting the type bars by power from an electric motor.

Another object of the invention is to provide improved automatic controlling mechanism for a motorized typewriter, which comprises a series of controlling elements, such as longitudinally movable bars, which are adapted to be permutably shifted to control power operable shifting devices from an electric motor.

Another object of the invention is to provide an improved automatic controlling mechanism which is adapted to be applied or built into a non-automatic motorized typewriter of usual construction.

Another object of the invention is to provide improved automatic control mechanism for a motorized typewriter, which can be confined mainly within the dimensions of the frame of a motorized typewriter of usual construction.

Another object of the invention is to provide improved automatic controlling mechanism for a motorized typewriter which comprises a tape to which the controlling mechanism is responsive and winding mechanism for the tape, the tape and winding mechanism being disposed outside of one side of the typewriter frame for convenient access for replacement; and power-mechanism disposed inside of said frame for advancing the tape synchronously with the operation of the controlling mechanism.

Another object of the invention is to provide improved means for advancing and rewinding the tape or record for controlling the operation of the power.

Another object of the invention is to provide improved power-operated means for synchronously controlling the key-controlling mechanism and the tape-feeding mechanism.

Another object of the invention is to provide improved automatic controlling mechanism for the type-shift and shift lock actions.

Another object of the invention is to provide improved manually operable starting means and automatic means for stopping the automatic control mechanism for the machine.

Other objects of the invention will appear from the detail description.

The invention consists in the several novel features hereinafter set forth and which are more particularly defined by claims at the conclusion hereof.

In the drawings: Fig. 1 is a side elevation, the cover for the tape being shown in elevation. Fig. 2 is a vertical section, parts being shown in elevation. Fig. 3 is a diagrammatic perspective of the automatic control mechanism, including one of the keys and type-bars. Fig. 4 is a horizontal section of the tape feeding and rewinding mechanism. Fig. 5 is a section taken on line 5—5 of Fig. 4. Fig. 5ª is a section taken on line 5ª—5ª of Fig. 4. Fig. 6 is a plan of the permutably shiftable controller bars, parts of some of the levers controlled by said bars and the cam for controlling the engagement of the levers and said bars, the typewriter frame being shown in section. Fig. 7 is a plan of a portion of the perforated tape for pneumatically controlling the operation of the pneumatic actions, the letters and symbols of the keys being shown above the respective perforations in the tape which control the keys. Figs. 8, 9, 10, 11, 12 and 13 are front elevations of the slidable controller bars, respectively. Fig. 14 is a front elevation of the comb-bar for guiding the control levers which are engageable with the controller bars. Fig. 15 is a section on line 15—15 of Fig. 15ª. Fig. 15ª is a section on line 15ª—15ª of Fig. 15. Fig. 16 is a section on line 16—16 of Fig. 16ª. Fig. 16ª is a section on line 16ª—16ª of Fig. 16. Fig. 17 is a section on line 17—17 of Fig. 17ª. Fig. 17ª is a section on line 17ª—17ª of Fig. 17. Fig. 18 is a section on line 18—18 of Fig. 18ª. Fig. 18ª is a section on line 18ª—18ª of Fig. 18. Fig. 19 is a perspective of the control mechanism for case shift and shift lock. Fig. 20 is a detail, partly in elevation and partly in section, of manual starting and automatic stop mechanism for the automatic control mechanism. Fig. 21 is a section on line 21—21 of Fig. 20. Fig. 22 is a section of one of the pneumatic actions for controlling one of the controller-bars. Fig. 23 is a transverse section of the typewriter illustrating one of the keys and type-bars, a motor-operable device for shifting the type-bar and the controller bars and lever for said device. Fig. 24 is a detail illustrating one of the devices for shifting a type-bar operatively engaged with the driving roll. Fig. 25 is a similar view illustrating one of the shifting devices disengaged from the driving roll, parts being broken away to show the spring-pressed arm for the rotatable member of each shifting device which is driven by the constantly driven power roll. Fig. 26 is a perspective of the rotatable member of one of the power operable shifting devices for the type-bars. Fig. 27 is a perspective of the control dog for said rotatable member.

The invention is exemplified as applied to a motorized typewriting machine which comprises a frame $a$; a full set of keys or levers $b$, for the usual number of type-bars $b^1$ and associated actions, such as the space-bar, shift lock, tabulator, back spacer, case shift, and carriage return; type-bars $b^1$ controllable by the type-keys of the set; an electric motor 22 (Fig. 3); a driving-roll 23 driven by said motor; and a series of devices $s$, each adapted to be coupled to and uncoupled from roll 23, and to shift by power a connection for operating one of the type-bars $b^1$ or the associated actions. These associated actions may be of any suitable construction, such as used in motorized typewriters.

The driving roll 23 is continuously driven from motor 22 by gearing which comprises a worm 24 (Fig. 3) on the shaft 25 of the motor, and a worm-gear 26 which is fixed to roll 23 and meshes with said worm. Roll 23 extends laterally across the machine to drive the entire set of devices $s$, and is fixed to a shaft 23ª which is suitably journalled in frame $a$.

Each shifting device $s$ comprises a bell-crank lever 33 which is fulcrumed on a rod 34 which is fixedly supported in a member of frame $a$. Each lever 33, by its pivotal movement on rod 34, is adapted to shift a type-bar or one of the associated actions, and comprises a horizontally extending arm 33ª (Figs. 24, 25) which is connected to the type-bar or action and a vertically extending arm 33ᵇ which carries at its lower end a rotatable element 35, which is provided with cam-faces 36 for rocking lever 33 on its fulcrum, to shift arm 33ª. Cam faces 36 are normally disengaged from roll 23. Upon a slight initial rotation of element 35 on its axis in lever-arm 33ᵇ, one of the serrated cam-faces 36 will engage roll 23 so the element will be rotated a cycle of less than one-half revolution and rock lever 33 to shift its arm 33ª for the operation by power of the type-bar or device connected to said lever. The slight initial rotation of each element 35 controls the operation of the devices $s$ from roll 23, and is controlled by a lever or dog 37 (see Fig. 27) which is pivoted at 37¹ in lever 33. Each rotatable element is provided with diametrically opposite stop lugs 36ª (Fig. 26) which are adapted to alternately engage abutments 37ª and 37ᵇ on dog 37 (Fig. 27) to arrest the element 35 (Fig. 26) at the end of each operation of lever 33. Controller dog 37 is provided with an abutment 37ª (Fig. 27) which is engaged by one of the lugs 36ª of element 35 to limit the rotative movement of said element by said roll, while the dog is in its shifted position. Dog 37 is provided with a lug 37ᵇ which arrests the element 35 against rotation in one direction after the dog has been shifted to its normal position. A pair of studs 35ª project from one side of rotatable element 35 at diametrically opposite points. An arm 38 (Fig. 25) is pivoted at 37¹ in lever 33 and a spring 38¹ presses said arm into position to shift one of the studs 35ª so one of the lugs 36ª on element 35 will be held against abutment 37ª at the end of an operative cycle of element 35, so that said elements will be rotated for engagement of said lug with abutment 37ᵇ when dog 37 is released to its normal position. Arm 38 also acts upon studs 35ª to impart initial rotation to element 35 on its axis to engage cam-surfaces 36 with roll 23, when dog 37 is shifted to withdraw abutment 37ᵇ from either of the stop-lugs 36ª. When dog 37 releases element 35, spring-pressed arm 38 will press the lowermost stud 35ª to impart sufficient initial rotation to said element on its own axis, to cause one of the cam-faces 36 to engage roll 23 (Fig. 24) so the latter, which is continuously rotating, will rotate the element an arc of less than one-half revolution, and during which rotation lever 33 will be rocked to effect an operation by power. When the crest of a cam-face 36 passes the roll-engaging point, arm 38 rotates the element to bring one of the stop-lugs 36ª against abutment 37ª and hold the element out of contact with roll 23. When dog 37 is restored to its normal position by the control mechanism, spring-pressed arm 38 rotates element 35 to bring a stop-lug 36ª (Fig. 26) against abutment 37ᵇ on dog 37 so the element will be held and arrested in its normal position until the dog 37 is again released. The shifting devices $s$ are alternately arranged at the front and back of roll 23 and are alike in construction so that a description of one is applicable to all.

All of the keys or levers $b$ are fulcrumed on a rod 30 which is supported in a member of the framework of the machine. Each key $b$ is held normally raised by a spring 45 and is provided with a depending arm $b^4$ (Fig. 3) having a slot 40 for a stud 39 on the upper end of the controller-dog 37 for one of the shifting devices $s$. Depression of the keys controls, through the dogs 37, the individual operation of the devices $s$. These keys $b$ are automatically controlled by mechanism hereinafter described. Each key is provided with the usual finger button so the devices $s$ can also be manually controlled. A spring 45 is applied to each key $b$ for its retraction.

All of the type-bars $b^1$ are fulcrumed on a rod $b^2$ which is supported in a frame $a^{10}$, as well understood in the art. Each type-bar is operable from a lever 33 by a toggle-lever 28 (Fig. 23) which is pivoted at 28ª in frame $a^{10}$ and to the type-bar, a link 31 pivoted to the rear end of lever 28ᵇ, a bell-crank lever 29 which is fulcrumed on rod 30 concentrically with keys $b$ and has one of its arms connected to link 31, and a link 32 between the other arm of lever 29 and arm 33ª of a lever 33 of one of the shifting devices $s$. A spring 44 is applied to each lever 28ᵇ for retracting it and the type-bar connected to said lever. A spring 45ª is applied to each lever 29 for retracting said lever, link 32 and the lever 33 to which said link is connected.

The automatic controlling mechanism for shifting devices $s$ exemplifying the invention, comprises a series $d$ of six longitudinally slidable bars; a set of levers $k$, respectively connected by links $k^1$ to the keys $b$ and extending over and across the series $d$ of said bars; a series of six pneumatic actions $e$ (Fig. 22) for controlling said bars respectively and a narrow tape or record $f$ (Fig. 7) provided with perforations for controlling said actions $e$. The tape $f$ is provided with single and plural perforations or instrumentalities on successive transverse lines thereof for permutably controlling the actions $e$, which permutably control the bars of series $d$. Through the permutative movements of the six controller bars, the full set of keys $b$ and shifting devices $s$ of the typewriter, usually forty-eight, are automatically controlled, as hereinafter described. The tape is narrow so it occupies little space and is disposed and advanced at the outside of one side of the typewriter frame $a$ where it is accessible for replacement; and the actions $e$, series of bars $d$, levers $k$, and other parts of the automatic control mechanism are disposed within said frame.

The series of bars $d$ comprise, for example, six longitudinally slidable controller-bars, individually designated $d^1$, $d^2$, $d^3$, $d^4$, $d^5$ and $d^6$, and six pneumatic actions $e$, each adapted to lock one of said bars in its normal position and against movement to the right by a spring 48 and to release the bar for movement to the right by said spring. Each of said bars is slidably supported by studs 46 which extend through slots in the ends of the bars and are supported from a comb-bar 47 which is fixed to the frame $a$. Each bar is provided in its lower edge with a notch 49 to receive a vertically movable pin $e^4$ which retains the bar in its normal position, and is releasable by an action $e$. The bars are secured together on studs 46 to form a unitary structure.

Each pneumatic action $e$ or valve (Fig. 22) comprises a box or casing $e^1$, a diaphragm $e^3$, and a vacuum-chamber $e^2$ adapted to act upon diaphragm $e^3$ to which is secured the upstanding pin $e^4$ which projects from the top of the casing $e^1$ and is adapted, while chamber $e^2$ is subjected to suction, to enter the notch 49 in one of the controller-bars to lock it in its normal position. A spring $e^5$ is applied to diaphragm $e^3$ to withdraw pin $e^4$ from notch 49 (Fig. 8) when the vacuum in chamber $e^2$ is decreased or broken. The chambers $e^2$ of all of the actions $e$ are connected by a branched pipe $h^1$ to a vacuum pump $h$ to subject the chambers $e^2$ to suction for holding the pins $e^4$ in their raised or operative positions. Pump $h$ is driven by a pulley 51 on motor-shaft 25, a belt 50 and a pulley 52 on the pump-shaft. The vacuum chambers $e^2$ of the actions $e$ are respectively and individually connected by air-pipes $g^4$ to air-ducts $g^1$ (Fig. 3) in a tracker-bar $g$ which is mounted on the outside of one side of the frame $a$. Each duct $g^1$ in the tracker-bar, through pipes $g^4$ individually controls one of the actions $e$. The ducts $g^1$ are arranged in a line transversely of the tape so that the pneumatic actions $e$ may be operated singly and in multiple in permutations according to the number and location of the perforations in a transverse line of the tape as it passes over the ducts $g^1$ in the tracker-bar.

When a duct $g^1$ in tracker-bar $g$ is opened to atmosphere by a perforation in tape $f$, air is admitted to the chamber $e^2$ and the suction applied to diaphragm $e^3$ is reduced so that spring $e^5$ will depress diaphragm $e^3$ and withdraw its pin $e^4$ from the notch 49 in the associated controller-bar so that said bar will be released. This condition remains until the duct $g^1$ is closed by the travel of the tape $f$ to an imperforate portion over said duct, whereupon the chamber $e^2$ is again evacuated by pump $h$. Diaphragm $e^3$ will then compress spring $e^5$ to lift pin $e^4$ into notch 49 as soon as the controller-bar is shifted back to its normal position. The actions or valves $e$ are operated singly, in multiple, and in any permutation, according to number and location of the perforations on successive transverse lines of the tape, to correspondingly control the bars $d$.

Levers $k$ correspond in number to keys $b$, are fulcrumed at $k^1$ on the frame of the machine, and are guided vertically in comb-bar 47. Each lever $k$ is connected by a link $k^2$ to one of the keys $b$ and is adapted to shift the key to shift the controller dog 37 for one of the devices $s$. Levers $k$ overlie and extend over the entire series of bars $d$, and are adapted to swing vertically to engage said bars under control of mechanism hereinafter described. A spring 56 (Fig. 2) is applied to each lever $k$ to press it downwardly. The slidable bars $d$ are shiftable singly, in multiple, and permutably. The downward movement of levers $k$ and keys $b$ controls the operation of dogs 37 which control devices $s$.

The upper margins of controller-bars $d^1$, $d^2$, $d^3$, $d^4$, $d^5$ and $d^6$ are provided with notches $d^7$ which are adapted to receive the levers $k$ and are spaced apart with intermediate abutment portions which are adapted to arrest said levers, as exemplified in Figs. 8 to 13. These notches and abutment portions are arranged according to a suitable code, so that by each single, plural and different permutation of the movements of the six bars $d$, the notches will be aligned under one of the levers $k$ to permit it to descend to shift one key $b$ and the dog 37 which is shiftable thereby to control one device $s$. The single, plural and different permutations of the movements of the bars $d$ collectively control the individual operation of the entire set of levers $k$ and keys $b$. All of the levers $k$ are arrested by at least one of the bars $d$, except that lever which overlies notches in all of the controller-bars, during each operation of the automatic control mechanism. The lever $k$ which is released is determined by the perforations in the tape, as exemplified in Fig. 7.

The tape $f$ may be of any desirable length and is wound on a supply spool 41, is drawn over the tracker-bar $g$, is advanced step-by-step by a feed-drum $f^2$ which is provided with teeth for engaging a central longitudinal row of perforations $f^1$ in the tape $f$, and is wound onto a take-up spool 42, by mechanism hereinafter described. The tape $f$ is provided at six transverse points with perforations $f^5$, $f^6$, $f^7$, $f^8$, $f^9$, $f^{10}$ (Fig. 7) arranged on transverse lines according to the permutative operations of the pneumatic actions $e$ desired to control the six controller-bars $d$ for controlling the entire set of devices $s$. The longitudinally successive perforations $f^5$ control the pneumatic action $e$ for controller-bar $d^1$; the longitudinally successive perforations $f^6$ control the pneumatic action $e$ for the controller-bar $d^5$; the longitudinally successive perforations $f^7$ control the pneumatic action $e$ for the controller-bar $d^4$; the longitudinally successive perforations $f^8$ control the pneumatic action $e$ for the controller-bar $d^3$; the longitudinally successive perforations $f^9$ control the pneumatic action for the controller-bar $d^2$; and the longitudinally successive perforations $f^{10}$ control the action $e$ for the controller-bar $d^1$. The perforations are arranged on transverse lines to control singly, in plural, or permutably, the pneumatic actions for correspondingly controlling the movement of the series $d$ of the controller-bars, respectively, so that, through the permutative movements of said bars, the entire set of devices $s$ will be automatically controlled.

The tape $f$ is provided with a central continuous longitudinal row of perforations $f^1$ (Fig. 7). The tape is advanced step-by-step by a drum $f^2$ which is provided with sprocket-teeth $f^3$ adapted to enter the perforations $f^1$. The tape is wound on a supply-spool 41 (Figs. 3, 4, and 5) which is provided with a longitudinally extending peripheral slot and a removable thimble 43 for securing the inner end of the tape to the spool 41. The thimble 43 permits the tapes to be readily replaced. The tape is wound around the outer periphery of spool 42. Between spool 41 and sprocket-drum $f^2$ the tape is looped and drawn taut to slide over the tracker-bar $g$. From the sprocket-drum $f^2$ the tape passes onto a take-up spool 42 which is provided with a slot 42$^1$ and a slotted removable thimble 43 for securing the leading end of the tape to said spool, (see Fig. 5$^a$).

One perforation $f^5$ controls the pneumatic action $e$ to control bar $d^6$ for the operation of the shift-lock key $b^{11}$; perforations $f^5$, $f^6$ simultaneously control two of the pneumatic actions $e$ for controlling bars $d^6$, $d^5$ to control the tabulator-key $b^{12}$; one perforation $f^6$ controls the actions $e$ for controlling singly bar $d^6$ to control the spacer-bar $b^{13}$; three perforations $f^5$, $f^6$, $f^7$ simultaneously control the three pneumatic actions $e$ for controlling bars $d^6$, $d^5$, $d^4$ for controlling the key $b$ for printing "q"; two perforations $f^5$, $f^7$ simultaneously control the pneumatic actions $e$ for controlling bars $d^6$, $d^4$ to control the key $b$ for printing "a"; two perforations $f^6$, $f^7$ simultaneously control the pneumatic actions $e$ for controlling bars $d^5$, $d^4$ to control key $b$ for printing "2"; one perforation $f$ singly controls the pneumatic actions $e$ for controlling bar $d^4$ to control the key $b$ for printing "z"; four perforations $f^5$, $f^6$, $f^7$, $f^8$ simultaneously control the pneumatic actions $e$ for controlling bars $d^6$, $d^5$, $d^4$, $d^3$ to control the key $b$ for printing "w"; three perforations $f^5$, $f^6$, $f^8$ simultaneously control the operation of actions $e$ for controlling the bars $d^6$, $d^5$, $d^3$ to control key $b$ for printing "s"; three perforations $f^5$, $f^7$, $f^8$ simultaneously control the operation of the actions $e$ for controlling the bars $d^6$, $d^4$, $d^3$ to control key $b$ for printing "3"; three perforations $f^6$, $f^7$, $f^8$ simultaneously control the operation of actions $e$ for controlling the bars $d^5$, $d^4$, $d^3$ to control key $b$ for printing "x"; two perforations $f^5$, $f^8$ simultaneously control the pneumatic actions $e$ for controlling bars $d^6$, $d^3$ to control the operation of the key $b$ for printing "e"; two perforations $f^6$, $f^8$ simultaneously control two of the pneumatic actions $e$ for controlling bars $d^5$, $d^3$ to control key $b$ for printing "d"; two perforations $f^7$, $f^8$ simultaneously control two of the pneumatic actions $e$ for controlling bars $d^4$, $d^3$ to control the key $b$ for printing "4"; one perforation $f^8$ controls the pneumatic actions $e$ for controlling the bar $f^8$ to control the key $b$ for printing "c"; four perforations $f^5$, $f^6$, $f^7$, $f^9$ simultaneously control the four pneumatic actions $e$ for controlling the bars $d^6$, $d^5$, $d^4$, $d^3$ to control the key $b$ for printing "r"; four perforations $f^5$, $f^6$, $f^8$, $f^9$ simultaneously control four of the pneumatic actions $e$ for controlling bars $d^6$, $d^5$, $d^3$, $d^2$ to control the key $b$ for printing "f"; four perforations $f^5$, $f^7$, $f^8$, $f^9$ simultaneously control the four pneumatic actions $e$ for controlling bars $d^6$, $d^4$, $d^3$, $d^2$ to control the key $b$ for printing "5"; four perforations $f^6$, $f^7$, $f^8$, $f^9$ simultaneously control the four pneumatic actions $e$ for controlling bars $d^5$, $d^4$, $d^3$, $d^2$ to control the key $b$ for printing "v"; three perforations $f^5$, $f^6$, $f^9$ simultaneously control the three pneumatic actions $e$ for controlling bars $d^6$, $d^5$, $d^2$ to control the key $b$ for printing "t"; three perforations $f^5$, $f^7$, $f^9$ simultaneously control the three pneumatic actions $e$ for controlling bars $d^6$, $d^4$, $d^2$ to control the key $b$ for printing "g"; three perforations $f^6$, $f^7$, $f^9$ simultaneously control the three pneumatic actions $e$ for controlling bars $d^5$, $d^4$, $d^2$ to control the key $b$ for printing "6"; perforations $f^5$, $f^8$, $f^9$ simultaneously control the pneumatic actions $e$ for controlling bars $d^6$, $d^4$, $d^3$ to control the key $b$ for printing "b"; three perforations $f^7$, $f^8$, $f^9$ simultaneously control the three pneumatic actions $e$ for controlling bars $d^4$, $d^3$, $d^2$ to control the key $b$ for printing "h"; two perforations $f^5$, $f^9$ simultaneously control the two pneumatic actions $e$ for controlling bars $d^6$, $d^2$ to control the key $b$ for printing "7"; two perforations $f^6$, $f^9$ simultaneously control the two pneumatic actions $e$ for controlling bars $d^5$, $d^2$ to control the key $b$ for printing "n"; two perforations $f^7$, $f^9$ simultaneously control the two pneumatic actions $e$ for controlling bars $d^4$, $d^2$ to control the key $b$ for printing "u"; two perforations $f^8$, $f^9$ simultaneously control the two pneumatic actions $e$ for controlling bars $d^3$, $d^2$ to control the key $b$ for printing "j"; perforation $f^9$, singly, controls the pneumatic action $e$ for controlling bar $d^2$ to control the key $b$ for printing "8"; four perforations $f^5$, $f^6$, $f^7$, $f^{10}$ simultaneously control the four pneumatic actions $e$ for controlling bars $d^6$, $d^5$, $d^4$, $d^1$ to control the key $b$ for printing "m"; four perforations $f^5$, $f^6$, $f^8$, $f^{10}$ simultaneously control the four pneumatic actions $e$ for controlling bars $d^6$, $d^5$, $d^3$, $d^1$ to control the key $b$ for printing "i"; four perforations $f^7$, $f^8$, $f^9$, $f^{10}$ simultaneously control the four pneumatic actions $e$ for controlling bars $d^4$, $d^3$, $d^2$, $d^1$ to control the key $b$ for printing "k"; three perforations $f^5$, $f^6$, $f^{10}$ simultaneously control the three pneumatic actions $e$ for controlling bars $d^6$, $d^5$, $d^1$ to control the key $b$ for printing "9"; three perforations $f^5$, $f^7$, $f^{10}$ simultaneously control the three pneumatic actions $e$ for controlling bars $d^6$, $d^4$, $d^1$ to control the key $b$ for printing a comma; three perforations $f^6$, $f^7$, $f^{10}$ simultaneously control the three pneumatic actions $e$ for controlling bars $d^5$, $d^4$, $d^1$ to control the key $b$ for printing "o"; three perforations $f^5$, $f^8$, $f^{10}$ simultaneously control the three pneumatic actions $e$ for controlling bars $d^6$, $d^3$, $d^1$ to control the key $b$ for printing "l"; three perforations $f^6$, $f^8$, $f^{10}$ simultaneously control the three pneumatic actions $e$ for controlling bars $d^5$, $d^3$, $d^1$ to control the key $b$ for printing a zero mark; three perforations $f^7$, $f^8$, $f^{10}$ simultaneously control the three pneumatic actions $e$ for controlling bars $d^4$, $d^3$, $d^1$ to control the key $b$ for printing a period; three perforations $f^5$, $f^9$, $f^{10}$ simultaneously control the three pneumatic actions $e$ for controlling bars $d^6$, $d^2$, $d^1$ to control the key $b$ for printing "p"; three perforations $f^6$, $f^9$, $f^{10}$ simultaneously control the three pneumatic actions $e$ for controlling bars $d^5$, $d^2$, $d^1$ to control the key $b$ for printing a semicolon; three perforations $f^7$, $f^9$, $f^{10}$ simultaneously control the three pneumatic actions $e$ for controlling bars $d^4$, $d^2$, $d^1$ to control the key $b$ for printing a hyphen; three perforations $f^8$, $f^9$, $f^{10}$ simultaneously control the three pneumatic actions $e$ for controlling bars $d^3$, $d^2$, $d^1$ to control the key $b$ for printing "/"; two perforations $f^5$, $f^{10}$ simultaneously control the two pneumatic actions $e$ for controlling bars $d^6$, $d^1$ to control the key $b$ for printing "½"; two perforations $f^6$, $f^{10}$ simultaneously control the two pneumatic actions $e$ for controlling bars $d^5$, $d^1$ to control the key $b$ for printing an apostrophe; two perforations $f^7$, $f^{10}$ simultaneously control the two pneumatic actions $e$ for controlling bars $d^4$, $d^1$ to control the stop-key $b^9$; two perforations $f^8$, $f^{10}$ control the actions $e$ for bars $d^4$, $d^6$ for controlling the back space key; two perforations $f^9$, $f^{10}$ simultaneously control two of the pneumatic actions $e$ for controlling bars $d^2$, $d^1$ to control the shift-key $b^{10}$; and a perforation $f^{10}$ singly controls the pneumatic action $e$ for controlling the bar $d^1$ to control the carriage returning mechanism. In this manner the six controller-bars are permutably controlled to control a full set of keys for the operation by power of a set of type-bars and associated mechanisms of the typewriter.

Power-operated mechanism is provided for controlling the retraction of each of the controller-bars of series $d$ in timed relation with the operation of the pneumatic actions which are under control of the perforations in the tape, after each automatic operation of one of the keys $b$ and in timed relation with the step-by-step movements of the tape $f$. This mechanism comprises a rotatable member 60 which extends across the frame $a$ under the entire series of control levers $k$ and is provided with a concentric portion 61 and an eccentric or cam portion 61a. An abutment 57a is adapted to be engaged and rocked by element 60 and is fixed to a shaft 58 which is journaled in the frame. A retracting arm 57 is fixed to the shaft 58 and extends into elongated notches 59 in the controller-bars $d$. A spring 65 is applied to shaft 58 to rock said shaft to swing abutment 57a into engagement with rotatable element 60 and shift arm 57 to retract the controller bars $d$ against the force of springs 48. Element 60 is driven from shaft 25 by a worm 62 and gear 63 at a ratio of 2 to 1 relatively to driving roll 23 so that element 60 will make a complete rotation during each operating cycle of one-half revolution of roll 23.

Rotatable element 60 extends beneath the entire set of levers $k$ and one revolution is imparted thereto for each automatic operation. Concentric face 61 of element 60 is adapted to lift and hold levers $k$ above controller bars $d$, so the latter will be free to move longitudinally during one-half of each revolution of element 60 and eccentric or cam-face 61a controls the down movement of levers $k$ in timed relation with the operation of the pneumatic actions $e$ so that a predetermined lever $k$ will drop into an aligned series of notches in the controller-bars $d$.

The operation of the controller-bars $d$ and levers $k$ is best explained in connection with quarter cycles of the revolutions of rotary element 60. Assuming the parts to be in the position shown in Figs. 15 and 15a, the tape will be stationary and positioned with one or more of its perforations over the ducts $g^1$ of the tracker-bar $g$, so the corresponding action or actions $e$ will be evacuated and the corresponding pins $e^4$ will be retracted to release the bars $d$ controlled thereby. The tape-feeding mechanism is on its retractile stroke and the tape is stationary. Retracting arm 57 is positioned to lock the bars $d$ in normal position, because cam 61a of element 60 then permits spring 65 to rock arm 57 to its operative position shown in Fig. 15a. Concentric portion 61 of element 60 then engages levers $k$ and holds them out of engagement with bars $d$ so the latter will be free to slide longitudinally and quickly to the right when released by arm 57.

During the succeeding quarter cycle the parts move into the position shown in Figs. 16 and 16a. Cam 61a will shift abutment arm 57a to rock arm 57 against the force of spring 65. Arm 57 will be positioned to release the bars $d$ which have been released by their actions $e$ and said bars will be shifted to the right by their springs 48, as shown in Fig. 16a. Concentric portion 61 of element 60 will retain levers $k$ separated from bars $d$, so the latter will be free to slide to the right. The tape-feeding mechanism is concluding its retractile stroke and the tape is stationary. The actuated actions $e$ continue to hold their pins $e^4$ depressed.

During the succeeding quarter cycle, the parts move into the position shown in Figs. 17 and 17a. Cam 61a permits the levers to drop until arrested by bars $d$. The bars released by action $e$ will produce an alignment of notches which permit the predetermined lever $k$ to drop, under the pressure of its spring 45, sufficiently to shift a key $b$ and one of the dogs 37 to control operation of the corresponding shifting device $s$. The remaining levers $k$ will be arrested by the abutment portions on bars $d$ and held ineffective to shift the keys $b$ connected thereto. The retracting arm 57 will be retained in its releasing position by concentric portion 61 of element 60. The tape-feeding mechanism has passed through an initial idle portion of its advancing stroke and is about to begin the portion of its advancing stroke which effects the advance of the tape. The actuated actions $e$ continue to release the bars $d$ controlled thereby.

During the next quarter cycle the parts move into the position shown in Figs. 18 and 18a. Element 60 will lift all the levers $k$ to their raised or normal position. The tape will be advanced one step to bring the perforations on the next transverse line of the tape $f$ into registry with ducts $g^1$ in the tracker-bar $g$. The actions $e$ controlled by the open ducts $g^1$ will be actuated to lower pins $e^4$ and release the bars $d$ controlled thereby. The arm 57 is retained in its inoperative position by element 60. During the next quarter cycle the parts move into the position shown in Figs. 15 and 15a, and the previously shifted bars $d$ will be retracted by element 60 and arm 57. Levers $k$ remain raised to free the bars $d$.

A feature of this controlling mechanism is that it controls the movements of the bars $d$ and levers $k$ with fixed intervals and correlative timing for operation at a very high speed.

The mechanism for advancing the tape step-by-step is operated by power from the shaft of element 60 and comprises an eccentric 66 (Figs. 3, 4 and 5) fixed to rotate with said element, a pawl 67 operated by said eccentric and a ratchet-wheel 68 engaged by pawl 67. Ratchet wheel 68 is fixed to the hub of a gear 72 which is loose on the shaft 69 of drum $f^2$. A spring-pressed dog 70 is pivoted on a stud 71 and engages ratchet-wheel 68 to prevent reversal.

Shaft 69 and sprocket $f^2$ fixed thereto are driven from gear 72 by a clutch 69a, one member of which is slidable on, and splined to, said shaft and is adapted to engage coacting clutch-teeth on gear 72. During the automatic operation of the typewriter, clutch 69a is engaged to drive shaft 69 and drum $f^2$ step-by-step. During the rewinding of the tape, clutch 69ª is held disengaged by a spring 69ᵇ to permit drum $f^2$ to idle. During each revolution of element 60 eccentric 66 will operate pawl 67 to rotate drum $f^2$ one step and advance the tape $f$ from one transverse line of perforations in the tape to the next. The pawl 67 travels on its idle stroke and this permits the tape to be advanced during approximately one quarter cycle of element 60. The difference in the static and dynamic timing due to a slight delay in the pneumatic and mechanical actions may be compensated for by relative setting of eccentric 66 on element 60.

The take-up spool 42 for tape $f$ is rotated from gear 72 through a gear 73 which surrounds the shaft 76 of said spool. A disk 78 is provided with a hub which is loose on shaft 76 and extends through gear 73 and a disk 77. A spring 74 between a nut 75 on said hub and disk 77 presses the disks together to frictionally grip gear 73. Shaft 76 is driven from disk 78 by a clutch 76ª, one member of which is slidable on, and splined to, shaft 76. A spring 76ᵇ presses the slidable member of clutch 76ª away from disk 78 to disconnect shaft 76 from gear 73 during the rewinding of the tape. During tape-feeding, clutch 76ª is coupled to disk 78 to drive shaft 76.

The peripheral speed of take-up spool 42 equals the peripheral speed of drum $f^2$ through the friction-drive between gear 73 and shaft 76, notwithstanding the increase of diameter of the roll of tape on said spool, and during the rewinding of the tape said clutch is disengaged from the disk 78 to permit rotation of the take-up spool 42 for the unwinding of the tape independently of gear 73 and disks 77, 78.

The mechanism for rewinding the tape $f$ onto the supply spool 41 at the end of the work of transcribing the record on the tape comprises a belt $n$ which is continuously driven by a pulley $n^1$ which is secured to rotate with the drive-roll 23 and a pulley $n^2$ which is loose on the shaft 83 of the supply-spool 41. Pulley $n^2$ is positioned between a disk $n^3$ which is fixed to shaft 83 and a disk $n^4$ which is slidable on said shaft. A thrust-bearing $n^7$ is provided on the inner end of shaft 83. A lever $n^5$ is fulcrumed at $n^6$ on frame-side 80, extended and adapted to engage thrust-bearing $n^7$ to clamp pulley $n^2$ between disks $n^3$ and $n^4$ for rotating the shaft 83 fixed to the supply-spool 41 to rewind the tape on said spool. The outer end of lever $n^5$ terminates in a cam groove $n^8$ in a sleeve $n^9$ which is fixed to a shaft 84. Lever $n^5$ is shiftable by the finger-wheel 85 fixed to shaft 84 into the position illustrated in Fig. 4, for rewinding. Lever $n^5$ is fulcrumed at $n^6$ on frame-side 80 and is adapted to engage clutch 76ª to drive the take-up spool 42 to engage clutch 69ª to drive drum $f^2$, and to release the pressure against thrust-bearing $n^7$ when the latter is shifted into one of its alternative positions for the step-by-step advance of the tape $f$ by pawl 67 and eccentric 66. In its other position, as shown by Fig. 4, lever $n^5$ will engage thrust-bearing $n^7$ to grip pulley $n^2$ between disks $n^3$, $n^4$ to drive the shaft 83 of the supply-spool 41, will release clutch 69ª to uncouple gear 72 from shaft 69 and release clutch 76ª to release spool 42 and its shaft 76 for reverse rotation during the rewinding operation. The frictional retardance of pulley $n^1$ to the rotation of shaft 83 of supply-spool 41 during the intermittent advance of the tape, keeps the tape taut over the tracker-bar and between spool 41 and drum $f^2$.

A nut $f^{10}$ adjustably secures sprocket-drum $f^2$ to its shaft 69, for setting the drum to bring the perforations in the tape coincident with ducts $g^1$ in the tracker-bar $g$ during the idle periods of the tape. This exemplifies rewinding mechanism for the tape which is driven from the motor-driven roll 23 which operates the shifting devices $s$ and a single controlling device for setting the mechanism for advancing the tape during the operation of the automatic control mechanism and for expeditiously rewinding the tape on the supply-spool so that the record of the tape may be repeatedly and automatically transcribed.

The tape-feeding and rewinding mechanism is mounted in an auxiliary frame which comprises sides 80, 81 which are secured together in spaced relation by posts 82. This auxiliary frame is mounted inside of the typewriter frame $a$. The shaft 83 for the supply-spool 33, shaft 69 for the drum $f^2$, shaft 76 for the take-up spool 42 and shaft 84 for controlling the feed-mechanism are mounted in frame-sides 80, 81, and project through one side of the typewriter frame $a$. The supply-spool 41, drum $f^2$, take-up spool 42 and the handle 85 on shaft 84 are disposed at the outside of one side of the frame $a$ for convenient access in manipulating the tape $f$. The tracker-bar $g$ is secured by a screw 86 to the outer side of frame $a$. A housing or guard 87 (Fig. 1) is provided around the tape, the supply and take-up spools, the tracker-bar and the tape-feed drum. The take-up spool 42 is provided with a slotted inner sleeve 43 which is removable endwise from the spool. The latter is provided with a slot 42¹ (Fig. 5ª) through which one end of the tape can be threaded and the sleeve 43 is provided with a slot 42¹. The end of the tape is gripped between the spool and the sleeve so that, upon removal of the sleeve the tape end may be connected to or disconnected from said spool. The supply-spool 41 comprises a sleeve 43 and this spool and sleeve are provided with slots similar to those in spool 42 and sleeve 43 for removably and conveniently securing the outer end of the tape $f$ to spool 41.

A clutch 64 (Figs. 3, 20, 21) is provided between element 60 and gear 63 for controlling the operation of the automatic controlling mechanism and the tape-feeding mechanism from said element. An arm 88 is fulcrumed on the main frame at 89 and engages the movable member of clutch 64 which is normally pressed into uncoupling position by a spring 90 between the coupling members. A starting key $b^8$ (Figs. 20 and 21) is pivotally carried by a lever $b^9$ which is fulcrumed on rod 30. A spring 97 holds lever $b^9$ and the key $b^8$ carried thereby normally raised. Key $b^8$ is pivoted at 91 to lever $b^9$ and is normally positioned relatively to said lever by an abutment 92 which engages the lower edge of said lever and a spring 93 which presses the abutment against the lever. Key $b^8$ is provided with a hook 94 which is adapted, when lever $b^9$ and key $b^8$ are depressed and finger pressure on the key swings the latter against the force of spring 93, to engage a strip 95 on a bar 96 which is supported on the frame $a$ of the machine. Lever $b^9$ is adapted to engage the inclined upper end of arm 88 to couple the members of clutch 64 against the force of spring 90. To start the automatic control mechanism, the operator will depress the starting-key $b^8$ and lever $b^9$ which will cause hook 94 to lock lever $b^9$ in clutch-engaging position.

Mechanism is provided for automatically releasing lever $b^9$ upon the completion of a series of printing operations, for example, when the record of a tape has been completed or for rewinding the tape. This mechanism comprises a control lever $k$ and a link $k^2$ between a slot in said lever $k$ and the lever $b^9$. Said lever $k$ is controlled by a pair of perforations $f^7$, $f^{10}$ in the tape $f$, the coacting pneumatic actions $e$, two of the controller-bars $d$ and the element 60 in the same manner as keys $b$ are controlled. When the notches $d^7$ in the controller-bars $d$ are aligned below said lever $k$ which is linked to lever $b^9$, said lever $k$ will drop into said notches and, through link $k^2$, depress lever $b^9$ and the fulcrum 91 of key $b^8$ to release hook 94 from strip 95 so that both keys $b^8$ and lever $b^9$ will move back to their normal raised position and the clutch 65 will be uncoupled to stop element 60 and the tape-feeding mechanism. This exemplifies manual means for starting and automatic means for stopping the automatic control mechanism.

The mechanism (Fig. 19) for controlling the devices for controlling the upper and lower case shift for printing the upper case type and symbols on type-bars $b^1$, comprises a pair of keys $b^{10}$, $b^{11}$, which are fulcrumed on rod 30. A crank 100 has its ends 101 journaled in the frame $a$ and extends through slots 102 in each of the keys $b^{10}$, $b^{11}$. Each of the keys $b^{10}$, $b^{11}$ is normally held in raised position by a spring 103. Key $b^{11}$ is automatically controlled by one of the levers $k$ which is connected to said key through a latch key $b^{12}$ and a link 110. Said latch is pivoted to key $b^{11}$ at 105 and a spring 109 normally holds the latch so its abutment 108 engages the lower edge of key $b^{12}$. When lever $k$, which is connected to key $b^{11}$, is operated by the automatic control mechanism hereinbefore described, link 110 will impart a slight initial pivotal movement to latch key $b^{12}$ sufficiently to cause the hook 106 to engage a fixed abutment 107 so that key $b^{11}$ will be locked in its depressed position, and key $b^{11}$ will render one of the devices $s$ operative to shift the upper case shift, as well understood in the art. Key $b^{11}$ is provided with an extension 115 which is connected, as well understood in the art, to locking mechanism for holding the upper case action in its shifted position. Consequently, when key $b^{11}$ is shifted responsively to the automatic control mechanism, the upper case action will be shifted to and locked for printing by the upper case type. An automatically controlled lever $k$ is connected by a link $k^2$ to key $b^{10}$. When key $b^{10}$ is depressed, crank 100 will depress key $b^{11}$ sufficiently to permit latch key $b^{12}$ to be disengaged from abutment 107 by spring 109, whereupon key $b^{11}$ will be released so that its extension 115 will release the locking device for the upper case action and permit it to be restored to the position for lower case printing. A single perforation $f^5$ in tape $f$ controls one of the pneumatic actions $e$ for permutably controlling bars $d$ for the operation of the lever $k$ for shift lock key $b^{11}$. A pair of perforations $f^9$, $f^{10}$ in tape $f$ simultaneously control two pneumatic actions $e$ to permutably control the lever $k$ which is connected to shift key $b^{10}$. Levers $k$ are provided with slots $k^4$ for the lower ends of links $k^2$ to permit the keys to be manually shifted to control the operation of dogs 37 for the operation of devices $s$ by power when the typewriting operations are to be manually performed.

The invention exemplifies automatic control mechanism for a motorized typewriter which is equipped with an electric motor and a series of selectively controllable devices for performing the several functions of the machine, which comprises a series of a relatively small number of permutably operable elements which, by their permutative movements, are adapted to control the shifting devices for printing and performing the associated functions in the machine. This makes it possible to use a narrow tape and a small number of pneumatic actions to perform the printing and other functions of the machine. The automatic control bars are adapted for operation at a high speed, being organized of parts which are timed with intervals for that purpose.

The automatic control-bars are disposed within the usual typewriter-frame and the tape is conveniently located on the outside of one side of the frame where it is conveniently accessible for replacement. The tape mechanism includes means for quickly rewinding for duplicate work. By locating the tape-carrying spools, feed-drum and tracker-bar on the outside of the frame and the remaining parts of the automatic control mechanism within the frame, the invention is adapted to be applied to motorized typewriters of usual construction.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In mechanism for controlling a motorized typewriter equipped with a main frame, a set of keys mounted within the frame, a set of type-bars, and means controlled by the keys for operating the type-bars, the combination of a motor, a series of permutably shiftable elements disposed within the frame for controlling the operation of the keys, a tape, pneumatic actions controlled by the tape for controlling the operation of said shiftable elements and disposed within the frame, a motor-operated rotatable element for controlling the retraction of said shiftable elements, supply and take-up spools and a feed-drum for the tape disposed on the outside of one side of the frame, mechanism disposed within the frame for operating the drum to advance the tape step-by-step and operable by the rotatable controlling element in the frame, and means controlled by the permutative movements of said elements for controlling the operation of the keys, respectively.

2. In mechanism for controlling a motorized typewriter equipped with a main frame, a set of keys mounted within the frame, a set of type-bars, and means controlled by the keys for operating the type-bars, the combination of a motor, a series of permutably shiftable elements disposed within the frame for controlling the operation of the keys, a tape, pneumatic actions controlled by the tape for controlling the operation of said shiftable elements and disposed within the frame, a motor-operated rotatable element for controlling the retraction of said shiftable elements, supply and take-up spools and a feed-drum for the tape disposed on the outside of one side of the frame, mechanism disposed within the frame for operating the drum to advance the tape step-by-step and operable by the rotatable controlling element in the frame, mechanism within the frame and operable by the rotatable controlling element for rotating the supply spool to rewind the tape, and means controlled by the permutative movements of said elements for controlling the operation of the keys, respectively.

3. In mechanism for automatically controlling a motorized typewriter comprising a set of keys and type-bars, means controlled by the keys for operating the type-bars and a main frame within which the keys are mounted, the combination of a series of permutably and longitudinally movable bars mounted within and above the bottom of said frame, means controlled by said bars for selectively and individually controlling the operation of the keys, a record tape, and devices mounted within the frame and directly beneath the bars, permutably controlled by the tape, and for controlling the bars.

4. In mechanism for automatically controlling a motorized typewriter comprising a set of keys and type-bars, means controlled by the keys for operating the type-bars and a main frame within which the keys are mounted, the combination of a series of permutably and longitudinally slidable bars mounted within and above the bottom of said frame, means controlled by said bars for selectively and individually controlling the operation of the keys, a record tape, and pneumatic devices mounted within the frame and directly beneath the bars, permutably controlled by the tape, and for controlling the bars.

5. In mechanism for automatically controlling a motorized typewriter comprising a set of keys and type-bars, means controlled by the keys for operating the type-bars and a main frame within which the keys are mounted, the combination of a series of permutably and longitudinally movable bars mounted within and above the bottom of said frame, means controlled by the bars for selectively and individually controlling the operation of the keys, tape-feeding mechanism mounted at one side of said frame, a record tape on said mechanism, and devices mounted within the frame and permutably controlled by the tape, for controlling the bars.

6. In mechanism for automatically controlling a motorized typewriter comprising a set of keys and type-bars, means controlled by the keys for operating the type-bars and a main frame within which the keys are mounted, the combination of a series of levers mounted within said frame, pivoted at their front ends to swing vertically and individually connected to the keys, a series of permutably and longitudinally movable bars mounted within said frame, for selectively and individually controlling the levers to control the operation of the keys, a record tape, and devices mounted within the frame, for permutably controlling the bars and permutably controlled by the tape.

7. In mechanism for automatically controlling a motorized typewriter comprising a set of keys and type-bars, means controlled by the keys for operating the type-bars and a main frame within which the keys are mounted, the combination of a series of levers mounted within said frame, pivoted to swing vertically at their front ends and individually connected to the keys, a series of permutably and longitudinally movable bars mounted within and above the bottom of said frame, for selectively and individually controlling the levers to control the operation of the keys, a record tape, and pneumatic devices for permutably controlling the bars, mounted within the frame and directly beneath the bars, and permutably controlled by the tape.

8. In mechanism for automatically controlling a motorized typewriter comprising a set of keys and type-bars and means controlled by the keys for operating the type-bars, the combination of a series of permutably and longitudinally movable bars, means controlled by the permutably and longitudinally movable bars for individually controlling the keys, spring-means for shifting the bars into operative position, a series of permutably operable pneumatic devices for controlling the shifting of the bars, comprising pins controlled by suction for engaging the bars and spring retractable to release the bars, a tape for controlling the spring retraction of the pins, and means for disengaging the bars from the pins when the pins are to be retracted to release the bars.

9. In mechanism for automatically controlling a motorized typewriter comprising a set of keys and type-bars and means controlled by the keys for operating the type-bars, the combination of a series of permutably and longitudinally movable bars, means controlled by the permutably and longitudinally movable bars for individually controlling the keys, spring-means for shifting the bars into operative position, a series of permutably operable pneumatic devices for controlling the shifting of the bars, comprising pins controlled by suction for engaging the bars and spring retractable to release the bars, a tape for controlling the spring retraction of the pins, and means for retracting the bars and for disengaging the bars from the pins when the pins are to be retracted to release the bars.

10. In mechanism for automatically controlling a motorized typewriter comprising a set of keys and type-bars and means controlled by the keys for operating the type-bars, the combination of a series of permutably and longitudinally movable bars, means controlled by the permutably and longitudinally movable bars for controlling the operation of the keys, the bars being provided with notches, spring-means for shifting the bars in one direction, means for retracting the bars against the force of the spring-means, a series of permutably operable devices for controlling the movements of the bars comprising elements for engaging the notches to hold the bars in their inoperative position and spring retractable from said notches to release the bars for movement by said spring-means to control the keys, and a tape for controlling the retracting movements of the elements.

11. In mechanism for automatically controlling a motorized typewriter comprising a set of keys and type-bars and means controlled by the keys for operating the type-bars, the combination of a series of permutably and longitudinally movable bars, means controlled by the permutably and longitudinally movable bars for controlling the operation of the keys, the bars being provided with notches, spring-means for shifting the bars in one direction, means for retracting the bars against the force of the spring-means, a series of permutably operable devices for controlling the movements of the bars comprising elements for engaging the notches to hold the bars in their inoperative position and spring-pressed to release the bars for controlling the keys, said retracting means being adapted to shift the bars to provide clearance for the free release of said elements, and a tape for controlling the devices.

12. In mechanism for automatically controlling a motorized typewriter comprising a set of keys and type-bars and means controlled by the keys for operating the type-bars, the combination of a series of permutably and longitudinally movable bars, means controlled by the permutably and longitudinally movable bars for controlling the operation of the keys, the bars being provided with notches, spring-means for shifting the bars in one direction, means for retracting the bars against the force of the spring-means, a series of permutably operable pneumatic devices for controlling the movements of the bars comprising elements for engaging the notches to hold the bars in their inoperative position and pneumatically releasable from said notches to release the bars, said retracting means being adapted to shift the bars to provide clearance for the free pneumatic release of said elements, and a tape for controlling the pneumatic devices.

13. In mechanism for automatically controlling a motorized typewriter comprising a set of keys and type-bars, means controlled by the keys for operating the type-bars, the combination of a series of spring-pressed levers individually connected to the keys, a series of permutably and longitudinally movable bars engageable by said levers, and provided with notches for receiving said levers, spring-means for imparting operative strokes to the bars, means for retracting the bars, a rotatable cam provided with means for intermittently disengaging the levers from the bars and releasing them for engaging the bars, a record tape, and means controlled by the tape for controlling the movements of the bars by the spring-means which impart operative strokes to the bars, while the levers are disengaged from the bars.

14. In mechanism for automatically controlling a motorized typewriter comprising a set of keys and type-bars, means controlled by the keys for operating the type-bars and a main frame in which the keys are mounted, the combination of a series of spring-pressed levers individually connected to the keys and mounted within the frame, a series of permutably and longitudinally movable bars mounted within and above the bottom of the frame, engageable by said levers, and provided with notches for receiving said levers, spring-means for imparting operative strokes to the bars, means for retracting the bars, a rotatable cam mounted within the frame and provided with means for intermittently disengaging the levers from the bars and releasing the levers to engage the bars, a record tape, and means controlled by the tape for controlling the movements of the bars by the spring-means which impart operative strokes to the bars, while the levers are disengaged from the bars.

15. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys mounted within the frame, tape-feeding mechanism mounted at one side of the frame, a record tape on said mechanism and devices controlled by the tape and mounted within said frame for controlling the permutative movements of the bars.

16. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys and mounted within the frame, tape-feeding mechanism mounted at one side of the frame, a record tape on said mechanism, devices controlled by the tape and mounted within said frame for controlling the permutative movements of the bars, a motor mounted on the frame, and means driven from the motor for operating the tape-feeding mechanism step-by-step.

17. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys and mounted within the frame, tape-feeding mechanism mounted at one side of the frame, a record tape on said mechanism, devices controlled by the tape and mounted within said frame for controlling the permutative movements of the bars, a motor mounted within the frame, means driven from the motor for operating the tape-feeding mechanism step-by-step, and means operable by the motor for re-winding the tape.

18. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys and mounted within the frame, tape-feeding mechanism mounted at one side of the frame, a record tape on said mechanism, pneumatic devices controlled by the tape and mounted within said frame for controlling the permutative movements of the bars, a motor mounted on the frame, and a pump within the frame, driven by the motor, and connected to exhaust air from said pneumatic devices.

19. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys mounted within the frame, tape-feeding mechanism mounted at one side of the frame, a record tape on said mechanism, devices for permutably controlling the bars from the tape disposed within the frame, a rotatable element within and extending transversely across the frame, and means operated by said element for operating the tape-feeding mechanism step-by-step.

20. In mechanism for automatically controlling a motorized typewriter comprising a set of keys and type-bars, means controlled by the keys for operating the type-bars and a main frame within which the keys are mounted, the combination of a series of permutably and longitudinally movable bars, means controlled by the permutably and longitudinally movable bars for individually controlling the keys mounted within the frame, tape-feeding mechanism mounted at one side of the frame, a record tape on said mechanism, devices for permutably controlling the bars from the tape disposed within the frame, a rotatable element within and extending transversely across the frame, means operated by said element for operating the tape-feeding mechanism step-by-step to advance the tape, tape rewinding mechanism, and means for disconnecting the rotatable element for advancing the tape from the tape advancing means while the tape is being rewound.

21. In mechanism for controlling a motorized typewriter equipped with a set of keys, a main frame extending around the keys, a set of type-bars and means controlled by the keys for operating the type-bars, the combination of a tape, supply and take-up spools for the tape, a feed drum for the tape, a tracker bar for the tape, said spools, drum and tracker bar being disposed at, and outside of one side of the frame, mechanism disposed within the frame and automatically controlled by the tape for automatically controlling the operation of the keys, and a motor connected to drive the feed drum and the take-up spool.

22. In mechanism for controlling a motorized typewriter equipped with a set of keys, a main frame surrounding the keys, a set of type-bars and means controlled by the keys for operating the type-bars, the combination of a tape, supply and take-up spools for the tape, a feed drum for the tape, a tracker bar for the tape, said spools, drum and tracker bar being disposed at, and outside of one side of the frame, mechanism disposed within the frame and automatically controlled by the tape for automatically controlling the operation of the keys gearing disposed within the frame for operating the feed drum and the take-up spool to advance the tape, and a motor inside of the frame connected to drive said gearing.

23. In mechanism for controlling a motorized typewriter equipped with a main frame, a set of keys, a frame extending around the keys, a set of type-bars and means controlled by the keys for operating the type-bars, the combination of a tape, supply and take-up spools for the tape, a feed drum for the tape, a tracker bar for the tape, said spools, drum and tracker bar being disposed at, and outside of one side of the frame, mechanism disposed within the frame and automatically controlled by the tape for automatically controlling the operation of the keys, gearing disposed within the frame for intermittently operating the feed drum to advance the tape and for re-winding the tape on the supply spool, and a motor inside of the frame connected to drive said gearing.

24. In mechanism for controlling a motorized typewriter equipped with a set of keys, a main frame extending around the keys, a set of type-bars and means controlled by the keys for operating the type-bars, the combination of a tape, supply and take-up spools for the tape, a feed drum for the tape, a tracker bar for the tape, said spools, drum and tracker bar being disposed at, and outside of one side of the frame, mechanism disposed within the frame and automatically controlled by the tape for automatically controlling the operation of the keys, gearing disposed within the frame for operating the feed drum and the take-up spool to advance the tape and for re-winding the tape on the supply spool, a motor connected to drive said gearing, and means for controlling the gearing to advance or re-wind the tape, comprising a button on the outside of one side of the frame.

25. In mechanism for controlling a motorized typewriter equipped with a set of keys, a main frame extending around the keys, a set of type-bars, and means controlled by the keys for operating the type-bars, the combination of a series of permutably shiftable elements disposed inside of the frame, a tape, means controlled by the tape for permutably controlling the shift of the elements to controlling position, supply and take-up spools and a feed-drum for the tape, said spools and drum being disposed on the outside of, and at one side of the frame, mechanism disposed inside of the frame for driving the drum and take-up spool to advance the tape, means disposed within the frame and controlled by the permutative movements of said elements for controlling the operation of the keys, respectively, and a motor connected to operate the driving mechanism for the take-up spool.

26. In mechanism for controlling a motorized typewriter equipped with a set of keys, a frame extending around the keys, a set of type-bars and means controlled by the keys for operating the type-bars, the combination of a series of permutably shiftable elements disposed inside of the frame, a tape, means controlled by the tape for permutably controlling the shift of the elements to controlling position, supply and take-up spools and a feed-drum for the tape, said spools and drum being disposed on the outside of, and at one side of the frame, mechanism disposed inside of the frame for driving the drum and take-up spool to advance the tape and for re-winding the tape on the supply spool, means disposed within the frame and controlled by the permutative movements of said elements for controlling the operation of the keys, respectively, and a motor connected to the driving mechanism to drive the take-up spool and the drum, and to drive the supply spool in re-winding the tape.

27. In mechanism for controlling a motorized typewriter equipped with a set of keys, a frame surrounding the keys, a set of type-bars and means controlled by the keys for operating the type-bars, the combination of a series of permutably shiftable elements disposed inside of the frame, a tape, means controlled by the tape for permutably controlling the shift of the elements to controlling position, supply and take-up spools for the tape, a tracker bar, a drum for advancing the tape, said spools, tracker bar and drum being disposed at, and outside of one side of the frame, mechanism disposed inside of the frame for driving the drum and take-up spool to advance the tape, means disposed within the frame and controlled by the permutative movements of said elements for controlling the operation of the keys, respectively, and a motor for driving the mechanism for driving the take-up spool and the drum.

ARTHUR H. BUCKLEY.